US010413932B2

(12) United States Patent
Khandelwal et al.

(10) Patent No.: US 10,413,932 B2
(45) Date of Patent: Sep. 17, 2019

(54) DEPOSITION CLOUD TOWER WITH AN INSERT FOR ADJUSTING THE DEPOSITION AREA

(71) Applicants: Manish Khandelwal, South Windsor, CT (US); Shampa Kandoi, Ellington, CT (US); Drew Bradley Stolar, South Windsor, CT (US); Susan G. Yan, South Glastonbury, CT (US); Steven M. Nelson, Simsbury, CT (US)

(72) Inventors: Manish Khandelwal, South Windsor, CT (US); Shampa Kandoi, Ellington, CT (US); Drew Bradley Stolar, South Windsor, CT (US); Susan G. Yan, South Glastonbury, CT (US); Steven M. Nelson, Simsbury, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 417 days.

(21) Appl. No.: 14/654,075

(22) PCT Filed: Dec. 21, 2012

(86) PCT No.: PCT/US2012/071321
§ 371 (c)(1),
(2) Date: Jun. 19, 2015

(87) PCT Pub. No.: WO2014/098905
PCT Pub. Date: Jun. 26, 2014

(65) Prior Publication Data

US 2015/0336120 A1 Nov. 26, 2015

(51) Int. Cl.
*B05C 19/00* (2006.01)
*B05B 7/14* (2006.01)
(Continued)

(52) U.S. Cl.
CPC .......... *B05C 19/008* (2013.01); *B05B 7/1459* (2013.01); *B05B 7/1463* (2013.01);
(Continued)

(58) Field of Classification Search
CPC ... B05B 7/1459; B05B 15/0425; B05C 15/00; B05C 19/00; B05C 21/005; B05C 19/008; B08B 15/02; Y10S 118/07
(Continued)

(56) References Cited

U.S. PATENT DOCUMENTS 2,842,093 A * 7/1958 O'Neill .................... B05B 1/28
118/301
3,545,996 A * 12/1970 Duncan .................... B24C 1/10
101/122

(Continued)

FOREIGN PATENT DOCUMENTS

JP 2008057000 A 3/2008
JP 2009102713 A 5/2009
WO 93/17182 9/1993

OTHER PUBLICATIONS

Extended European Search Report for European Application No. 12890350.7 dated Jun. 27, 2016.
(Continued)

*Primary Examiner* — Karl Kurple
(74) *Attorney, Agent, or Firm* — Carlson, Gaskey & Olds

(57) ABSTRACT

A cloud tower (11) receives microscopic particles (18) impelled by an inert gas (17) for deposition on a porous substrate (29) having vacuum (34) disposed on opposite side. To alter the size and/or shape of the deposition field without changing the entire tower structure, a pair of flaps (43, 44) are hinged (47, 48) on one side or on a pair of opposed sides of the cloud primary tower. Another embodi-
(Continued)

ment places selectable tower inserts (36, 38) within the primary tower structure, fitting therein and sealing thereto.

11 Claims, 6 Drawing Sheets

(51) Int. Cl.
*B05D 1/10* (2006.01)
*C23C 24/02* (2006.01)
*B05D 7/22* (2006.01)
*B05B 12/36* (2018.01)
*H01M 4/88* (2006.01)
*B05D 1/12* (2006.01)
*B05D 3/04* (2006.01)

(52) U.S. Cl.
CPC .............. *B05B 12/36* (2018.02); *B05D 1/10* (2013.01); *B05D 7/22* (2013.01); *C23C 24/02* (2013.01); *B05D 1/12* (2013.01); *B05D 3/0493* (2013.01); *H01M 4/886* (2013.01); *H01M 4/8807* (2013.01)

(58) Field of Classification Search
USPC ............ 118/DIG. 7, 309, 326, 50; 134/183; 239/275; 454/50
See application file for complete search history.

(56) References Cited

U.S. PATENT DOCUMENTS

| | | | | |
|---|---|---|---|---|
| 3,695,226 | A * | 10/1972 | Wanner | B05B 15/1229 118/326 |
| 3,745,969 | A * | 7/1973 | Huffman | C23C 16/4584 118/730 |
| 4,233,181 | A * | 11/1980 | Goller | H01M 4/886 264/122 |
| 4,340,563 | A * | 7/1982 | Appel | B32B 37/15 264/518 |
| 4,783,006 | A * | 11/1988 | Hayashi | C23C 4/12 118/300 |
| 4,791,007 | A * | 12/1988 | Gleason | B05B 15/0475 118/504 |
| 4,933,211 | A * | 6/1990 | Sauvinet | B05B 7/025 118/308 |
| 5,520,735 | A * | 5/1996 | Mulder | B05B 5/032 118/308 |
| 5,529,815 | A * | 6/1996 | Lemelson | C23C 16/04 118/720 |
| 5,656,138 | A | 8/1997 | Scobey et al. | |
| 5,790,913 | A * | 8/1998 | Roberts, Jr. | G03G 13/22 348/128 |
| 5,807,435 | A * | 9/1998 | Poliniak | B05B 5/08 118/300 |
| 5,811,020 | A * | 9/1998 | Alwan | G03F 7/164 216/11 |
| 6,312,526 | B1 * | 11/2001 | Yamamuka | C23C 16/4401 118/720 |
| 6,490,994 | B1 * | 12/2002 | Yoshizawa | C23C 16/452 118/723 E |
| 6,638,880 | B2 * | 10/2003 | Yamamuka | C23C 16/4401 118/695 |
| 6,746,539 | B2 * | 6/2004 | Sun | C23C 18/00 118/715 |
| 7,618,493 | B2 * | 11/2009 | Yamada | C23C 16/4401 118/715 |
| 8,039,052 | B2 * | 10/2011 | Endo | C23C 16/4412 118/722 |
| 8,770,143 | B2 * | 7/2014 | Endo | C23C 16/4412 118/723 R |
| 9,303,316 | B1 * | 4/2016 | Shufflebotham | C23C 14/566 |
| 9,731,304 | B2 * | 8/2017 | Paris | B05B 1/202 |
| 2002/0100424 | A1 | 8/2002 | Sun et al. | |
| 2002/0134668 | A1 | 9/2002 | Wan et al. | |
| 2003/0131791 | A1 * | 7/2003 | Schultz | B05B 13/0431 118/324 |
| 2005/0059246 | A1 * | 3/2005 | Yamada | C23C 16/4401 438/689 |
| 2006/0231031 | A1 * | 10/2006 | Dings | C23C 16/04 118/723 R |
| 2007/0074661 | A1 * | 4/2007 | Franken | C23C 16/45508 118/715 |
| 2008/0098956 | A1 * | 5/2008 | Serfozo | B05B 15/0481 118/504 |
| 2009/0061087 | A1 * | 3/2009 | Endo | B01J 19/0046 427/255.5 |
| 2010/0075051 | A1 * | 3/2010 | Darling | B05B 15/0456 427/282 |
| 2012/0107497 | A1 * | 5/2012 | Steinmann | B05B 7/1404 427/203 |
| 2013/0192519 | A1 * | 8/2013 | Kim | B05B 5/032 118/50.1 |
| 2014/0311408 | A1 * | 10/2014 | De | C23C 16/4412 118/708 |

OTHER PUBLICATIONS

International Search Report for International Application No. PCT/US2012/071321 dated Aug. 27, 2013.

* cited by examiner

Vacuum

DEPOSITION CLOUD TOWER WITH AN INSERT FOR ADJUSTING THE DEPOSITION AREA

TECHNICAL FIELD

Mixtures of micron-sized particles, such as platinum and TEFLON®, are impelled within a cloud deposition tower by means of pressurized inert gas so as to impinge on a target, such as a porous carbon substrate of a fuel cell, the gas being drawn off through the pores by vacuum. The field of impingement is adjustable by means of hinged walls, or selectable interior wall structures.

BACKGROUND

A common manufacturing process includes the deposition of mixtures of micron-sized (microscopic, hereinafter) particles. One example is the deposition of a mixture of microscopic particles of TEFLON® and catalyst, such as platinum, on porous carbon substrates used in fuel cells, such as the gas diffusion layer. Another example is diffusion of microscopic carbon and TEFLON® particles on porous carbon substrates so as to provide hydrophobic carbon/carbon substrates (or micro porous layer).

Herein, the devices that enable the deposition of microscopic particles will be referred to as a cloud tower, since typical apparatus resembles a truncated pyramid tower disposed over a vacuum work table, into which the microscopic particles are impelled by inert gas, such as nitrogen.

The cloud tower is fed by a tube or other passageway from material processing apparatus. One example is the formation of a slurry of a desired catalyst and TEFLON®. The slurry is then dried to form pellets, and the pellets are ground into microscopic particles. The pellets are drawn into the hose or other conduit by high pressure inert gas, such as nitrogen, which may be accomplished using an eductor, (sometimes called an ejector).

The work table is either formed of a suitable mesh or has a substantial number of holes therein so as to substantially uniformly apply a vacuum which is attached to the bottom of the work table, to attract and thereby distribute the particles throughout the target area, to draw the inert gas through the pores of the substrate being treated, and for exhaust to atmosphere. Typically, the work table, including the vacuum apparatus, may be raised and lowered in order to place the substrates within the cloud tower for processing; alternatively, the cloud tower itself may be raised due to suitable flexibility in the tube or other conduit.

The cloud towers are custom designed in each case to service a selected size of a sheet of porous carbonaceous material to be processed. Heretofore, the only way to alter the size of the deposition would entail a redesigning of the tower itself in addition to adjusting the points of application of vacuum. While the application of vacuum is easily adjusted, by masking or otherwise, without affecting the process itself (other than the points of application of vacuum), the utilization of a mask within the cloud tower alters the flow distribution of the cloud of mixed microscopic particles, causing wavelets and other distortion in the localized magnitude of distribution. Furthermore, there is local distortion at the mask/substrate interface. These effects easily result in an unwanted variation in the distribution of the particles, and therefore a variation in the degree of activity, for instance, in a substrate having catalyst deposited thereon.

Therefore, means other than the utilization of a mask on a substrate are needed in order to adjust the size or shape of the field of deposition of microscopic particles.

SUMMARY

Disclosed is a cloud tower which receives microscopic particles impelled by an inert gas for deposition on a porous substrate having vacuum disposed on a side of the substrate opposite to that on which the microscopic particles are impinged, with the ability to alter the size and/or shape of the deposition field without changing the entire tower structure.

A first embodiment of the modality herein includes a pair of flaps hinged on one side, or on a pair of opposed sides of the cloud tower so as to change the deposition area from a square to a rectangle, or from a larger rectangle to a smaller rectangle or square. Another embodiment is the utilization of the primary cloud tower together with selectable tower inserts which are smaller than the primary tower structure, fitting therein and sealing thereto, thereby altering the shape and/or size of the target area. The inserts may provide deposition fields in the shape of circles, ovals, ellipsis, small squares, smaller squares or rectangles, or otherwise as is desired.

In the utilization of the present modality, masking of the area of application of vacuum may occur with simple masking, because the masking itself will not alter the cloud deposition process in any way except to limit the vacuum to the desired field of deposition.

The modality herein may be utilized for the application of any microscopic particles or mixtures of particles which are suited to pressurized, impelled dispersion onto porous substrates aided by a vacuum, as is within the capability of cloud towers in general. This includes mixtures other than those of a catalyst with TEFLON®, or carbon with TEFLON®; as those are only examples of the modality herein.

Other variations will become more apparent in the light of the following detailed description of exemplary embodiments, as illustrated in the accompanying drawings.

MODE(S) OF IMPLEMENTATION

Figure 1:
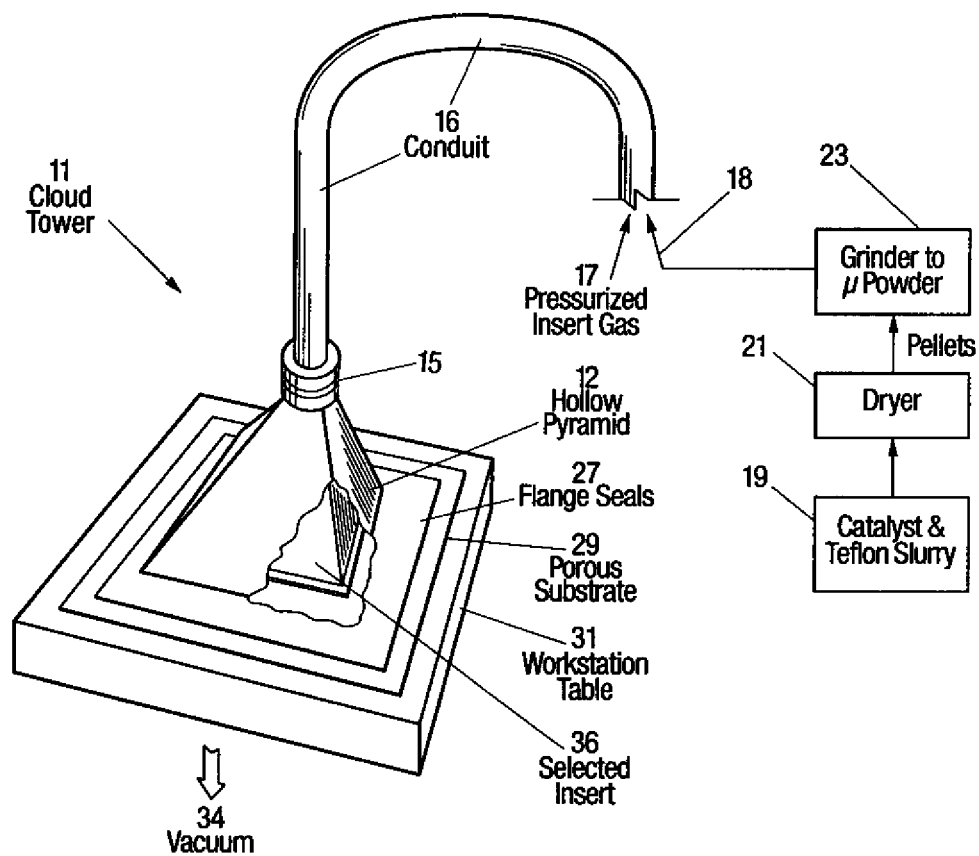
FIG. 1 is a combination of a partially broken away perspective view of one example of the modality herein within a typical prior art cloud tower which has been adapted for the present modality, along with conventional material apparatus depicted as blocks.

Referring to FIG. 1, a cloud tower 11 comprises a truncated pyramid 12 of impervious, relatively thin material, such as sturdy sheet steel or a suitable structural plastic.

Truncated forms will herein be referred to in terms of their form description, such as the pyramid 12. The pyramid 12 has a coupling 15 attaching it to a flexible (or in some cases inflexible) conduit such as a tube 16. The tube 16 receives a mixture of pressurized inert gas (indicated by arrow 17) and microscopic (micron-sized) particles (indicated by arrow 18) which become thoroughly mixed within the tube 16 and are thereafter impelled through the coupling 15 and into the pyramid 12.

The mixture of particles is provided by a source 19 of, for example, catalyst and TEFLON®, in a slurry. This is provided to a dryer 21 that converts the catalyst and TEFLON® into a mixture of small, dry pellets. The pellets are provided to a grinder 23, which provides microscopic particles of catalyst and TEFLON® to the tube 16.

The microscopic particles may be ingested into the tube 16 through the secondary inlet of an eductor not shown (sometimes referred to as an ejector), the primary inlet to which is attached to pressurized inert gas, or in some other conventional fashion. The pressure of the gas need not be much above atmospheric but simply enough to impel the pellets through the tube 16 and into the tower 11.

The pyramid has flanges 27 which may include soft seals, which rest on the target, such as a porous substrate 29, which in turn is carried by a work station table 31. In the present example, the porous substrate 29 is carbon. The work station table 31 is either a mesh or has numerous holes therein throughout the intended deposition area so as to provide vacuum to the interior of the pyramid 12, as represented by the arrow 34. The vacuum assists in dispersing the microscopic particles throughout the area within the pyramid 12, thereby to cover the entire intended portion of the porous substrate 29. The vacuum also draws the inert gas away from the substrate surface so as to allow the continuum of impingement to occur.

The description thus far is of a microscopic particle cloud deposition tower apparatus known to the art. In accordance with the modality herein, however, there is provided a tower insert 36, which in this case is also a pyramid. Although the pyramid 12 (referred to hereinafter as the primary pyramid 12) is typically a square pyramid in the prior art, the shape thereof is immaterial to the modality herein. Similarly, pyramid-shaped tower insert 36 in accordance with the modality herein may be square or rectangle despite the shape of the primary pyramid 12, so long as the selected tower insert 36 will fit therein. The size of the selected tower insert may also vary as desired.

FIG. 2 is a portion of the view in FIG. 1, except that, within the primary pyramid 12, there is a selected tower insert 38 which is curvilinear, and which could either be conical, as in FIG. 2, or other conoids such as ellipses and ovals as desired. Furthermore, the selected tower insert may be of another shape. In the embodiments of FIGS. 1 and 2, the coupling 15 is adapted to receive similar but smaller couplings which may have a key to align the selected inserts' coupling with the coupling 15 to ensure that the tower insert is properly aligned with the target, porous substrate 29. Otherwise, an equally effective means for alignment may be provided.

FIG. 3 shows an approximate illustration of the height to base-width aspect ratio, which typically may be on the order of 2.5 to 1. However, for clarity of exemplary details, the disclosure herein illustrates pyramids having aspects closer to 1 to 1, or less.

In another embodiment, two flaps 43, 44 are able to swing between an inoperative position, as in FIG. 4 and an operative position shown in FIG. 5. The flap 44 is against the flap 43 and the flap 43 is against the pyramid wall 45. The motion between these two positions does not cause any gaps between the outer edges of the flaps 43, 44 and respective walls 56, 57 of the primary pyramid 12*a* because the hinges 47, 48 are at exact right angles (90°) with respect to the corresponding walls 56, 57.

Referring to FIGS. 4 and 5, a pair of flaps 43, 44 are disposed against one wall 45 of a primary pyramid 12*a* by respective hinges 47, 48. In FIG. 5, the flaps 43, 44 are shown in the operative position with the bottom edges resting on (or near) the substrate. The hinge 47 is mounted to the wall 45 below the hinge 48 so that the flap 43 will be behind the flap 44. The purpose is so that once the flaps are brought forward into the operative position as illustrated in FIG. 5, they will overlap sufficiently to provide a seal.

The flaps 43, 44 are moved into the operative position shown in FIG. 5 by a positioning mechanism 60 which pushes a rod 62 inwardly as shown by an arrow 63. The rod 62 is fastened to a push plate 66 such as by welding or brazing, and is also fastened at its rightmost end to the flap 44. Thus, the push plate 66 pushes the two flaps to the operative position, and since it is fastened to the flap 44, will pull the flap 44 and therefore the flap 43 back into the inoperative position, the push plate 66 nesting into a void 68 of the appropriate size in the wall 45. Since the flaps 43, 44 cover the void, it can be ample without worrying about a seal, or a seal may be provided.

A soft seal may be placed along the back of flap 44 and along the front of the flap 43 where such seals could touch the opposing flap, as desired in any given implementation of the modality herein. However, such seals may generally be unnecessary. Further, when the flaps are in the operative position as shown in FIG. 5, the vacuum may be limited to the area below and to the right of the flaps 43, 44 (as seen in FIG. 5), such as by masking, if desired in any given implementation. Therefore, between the cloud pressure tending to push on the flap 44 and the resistance provided to the flap 43 by the positioning mechanism 60 by the rod 62, depending on the pressure of the incoming flow and of the vacuum, there should be no need for seals. There may or may not be any seals, in any event.

Referring to FIG. 6, the view from the left side of the flaps 43, 44 (as seen in FIG. 5) shows the push plate 66 broken away to reveal the rod 62 which may be welded, or even screwed (from the right to the left) for a tight fastening to the flap 44. Since both rotate at the same time either into or out of the operative position, there is no relative up/down motion between any given points on the flaps. Thus, the only relative motion between the flaps 43, 44 is horizontal.

To accommodate the horizontal movement between the two flaps as they move to and from the operational position, a slot 71 is provided in the flap 43, to allow horizontal motion of the rod 62 as the flap 44, to which it is fastened, moves back and forth horizontally, as both flaps move up or down, due to the non-horizontal position of the hinges 47, 48. The rod 62, push plate 66 and slot 71 are shown in FIG. 6 in phantom in their respective positions when the flaps 43, 44 are in the inoperative position. As the rod moves back and forth to adjust the positions of the flaps, the push plate 66 will only move a few inches, such as less than three inches in the example illustrated in FIGS. 4-6. This will cause the rod to move sideways less than about two inches in the example.

In this embodiment, the hinges 47, 48 are disposed directly to the primary pyramid 45. Obviously, if the flaps 43, 44 were wider, the slot 71 longer, and the hinges slideable upwardly, then the target area on the substrate 29 could be reduced further. With shorter but wider flaps and hinges slideable downwardly, that would permit having the degree of target area illustrated in FIG. 5 but with shorter flaps (as just described above). Thus, infinite positioning over a finite range of target area may be achieved.

The foregoing has been described with respect to flaps 43, 44 disposed on a single wall 45. Similar flaps may be disposed on a wall opposite to the wall 45 as desired, to provide further adjustment to the target size and shape, as well as positioning of the target.

Figure 2:
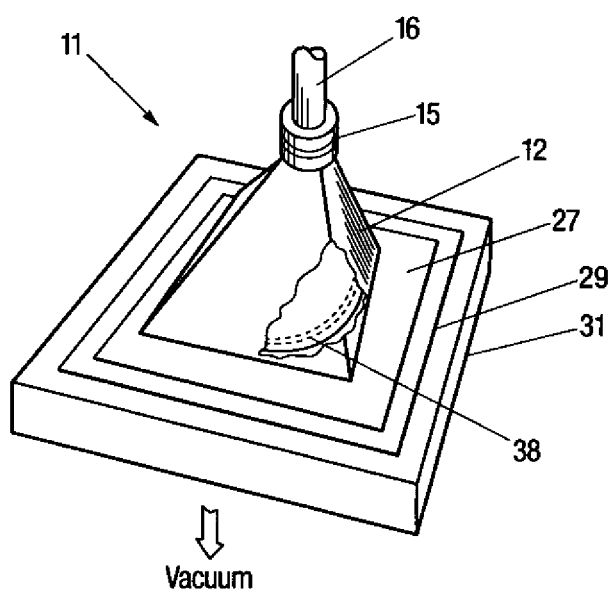
FIG. 2 is a fragmentary, partially broken away perspective view of the cloud tower of FIG. 1 but having a curvilinear (round, oval or elliptical) tower insert in accordance herewith.
Figure 3:
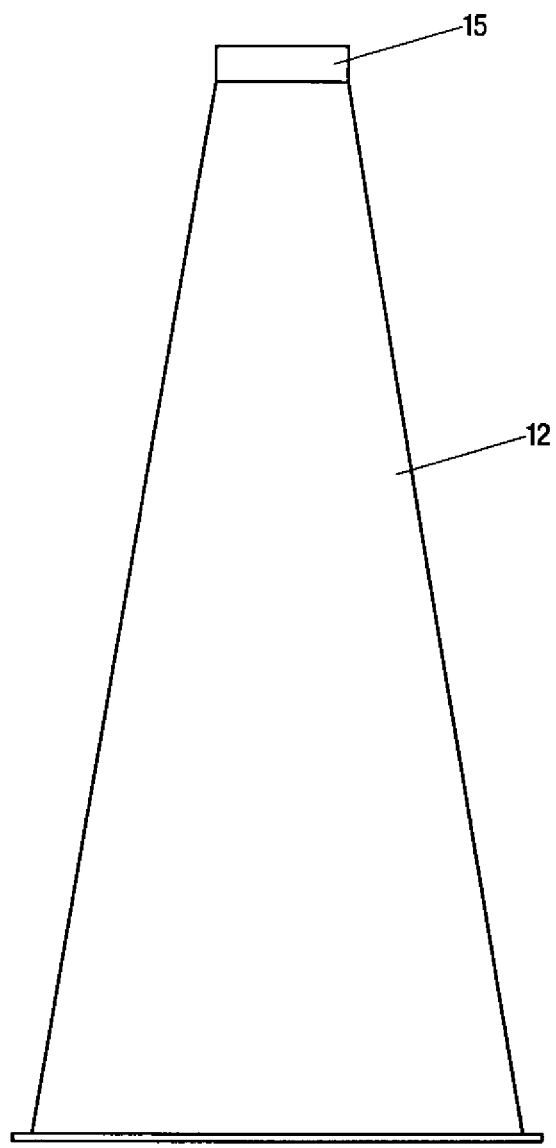
FIG. 3 is a front elevation view of a cloud tower illustrating a common height/base aspect ratio.
Figure 4:
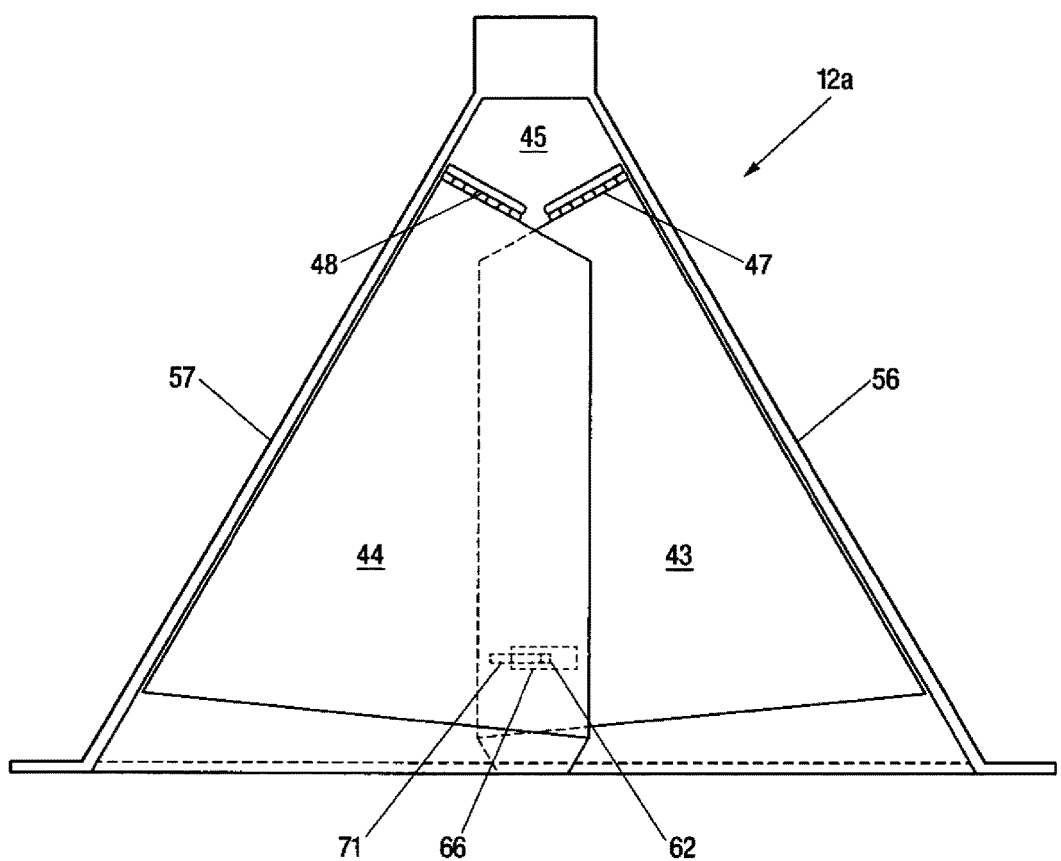
FIG. 4 is a fragmentary side elevation view of a cloud tower having two hinged flaps extended into an operative position, required for one side of a pyramid to reduce the area of deposition, in accordance herewith.
Figure 5:
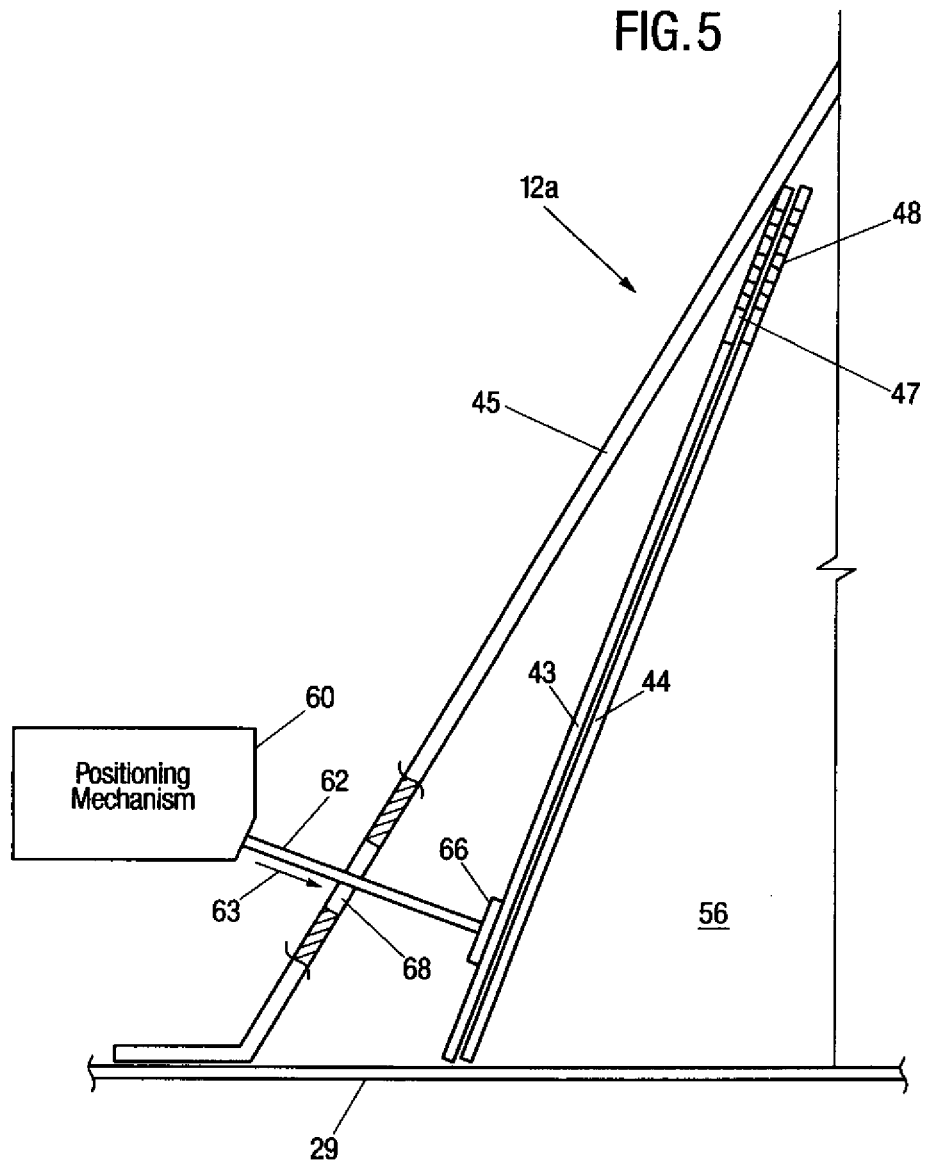
FIG. 5 is a front elevation view of the cloud tower of FIG. 4 with the flaps withdrawn from the operative position.
Figure 6:
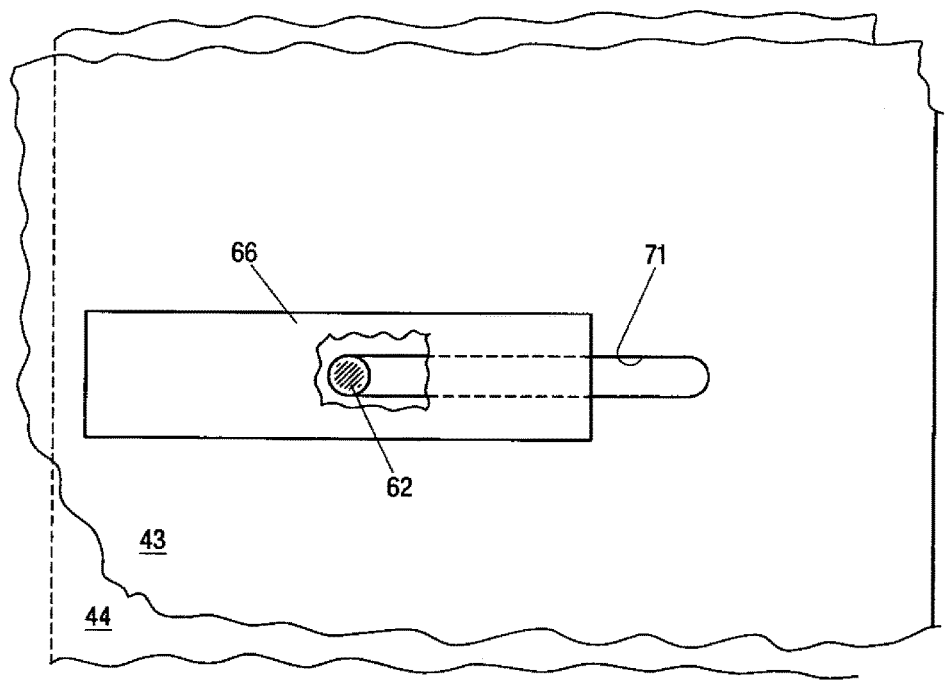
FIG. 6 is a fragmentary, partially broken away rear elevation view of the motion rod, push plate and slots.

The description referring to FIGS. 1 and 2 shows that means, including wall structure in addition to the wall structure of the primary cloud tower, may be tower inserts of various shapes and sizes, such as pyramid insert 36, cone insert 38 and so forth. The description referring to FIGS. 4-6 shows that such means may be hinged flaps, such as flaps 43, 44.

Since changes and variations of the disclosed embodiments may be made without departing from the concept's intent, it is not intended to limit the disclosure other than as required by the appended claims.

The invention claimed is:

1. A material deposition device, comprising: a support surface configured to support a substrate; a primary tower that defines an enclosed interior space having a first volume, the primary tower having one end received adjacent the support surface, the one end of the primary tower having at least one dimension that establishes a first deposition area within the interior space for depositing a material on a substrate on the support surface;
    a source of vacuum that establishes a vacuum within the interior space that draws the material toward the support surface; and
    a tower insert configured to be received in the interior space, the tower insert selectively establishing a second, smaller volume in the interior space, the tower insert having at least one edge that, when received adjacent the support surface, establishes a second, smaller deposition area within the interior space for depositing the material on the substrate on the support surface.

2. The material deposition device of claim 1, wherein the tower insert comprises a truncated pyramid.

3. The material deposition device of claim 1, wherein the tower insert comprises a truncated cone.

4. The material deposition device of claim 1, wherein
    the tower insert comprises a seal along the at least one edge; and
    the seal is received against the support surface for sealing an interface between the at least one edge and the support surface.

5. The material deposition device of claim 4, wherein
    the primary tower comprises a primary tower seal along the one end of the primary tower for sealing an interface between the primary tower and the support surface.

6. The material deposition device of claim 1, wherein
    the tower insert comprises a plurality of flaps;
    the flaps are moveable relative to an interior surface of the primary tower into a position where the flaps establish at least one of the second volume and the second deposition area.

7. The material deposition device of claim 6, wherein the flaps are connected to the primary tower by respective hinges.

8. The material deposition device of claim 7, wherein
    the hinges are respectively located near an end of the flaps that is distal from the at least one edge.

9. The material deposition device of claim 6, wherein
    at least one of the flaps includes a seal that is configured for sealing an interface between the at least one of the flaps and an adjacent one of the flaps at least when the flaps are in a position to establish the second deposition area.

10. The material deposition device of claim 1, wherein the material is deposited on a portion of the substrate on the support surface corresponding to the second deposition area when the tower insert is positioned in the interior space to establish the second deposition area; and otherwise the material is deposited on an area of the substrate on the support surface corresponding to the first deposition area.

11. The material deposition device of claim 1, comprising a porous substrate supported on the support surface; and wherein the vacuum within the interior space draws the material onto the porous substrate to establish a deposited layer of the material on the porous substrate.

* * * * *